US009052186B2

(12) United States Patent
Chang

(10) Patent No.: US 9,052,186 B2
(45) Date of Patent: Jun. 9, 2015

(54) CORRESPONDENCE MAPPING BETWEEN AN IMAGING SYSTEM AND A DIRECTIONAL RENDERING SYSTEM

(71) Applicant: HEWLETT-PACKARD DEVELOPMENT COMPANY, LP, Fort Collins, CO (US)

(72) Inventor: Nelson L Chang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 199 days.

(21) Appl. No.: 13/756,451

(22) Filed: Jan. 31, 2013

(65) Prior Publication Data

US 2014/0210811 A1 Jul. 31, 2014

(51) Int. Cl.
G06T 15/00 (2011.01)
G01B 11/00 (2006.01)
G01B 11/25 (2006.01)

(52) U.S. Cl.
CPC ............ *G01B 11/00* (2013.01); *G06T 15/005* (2013.01); *G01B 11/2513* (2013.01)

(58) Field of Classification Search
CPC ... G06T 15/005; G01B 11/2513; G01B 11/00
USPC ............. 345/418, 419; 382/128, 285; 348/51, 348/188, 383
See application file for complete search history.

(56) References Cited

U.S. PATENT DOCUMENTS

| 8,172,407 | B2 | 5/2012 | Lim |
| 8,195,006 | B2* | 6/2012 | Klemmer et al. ............. 382/285 |
| 8,446,461 | B2* | 5/2013 | Jian ................................ 348/51 |
| 8,477,241 | B2* | 7/2013 | Chang et al. .................. 348/383 |
| 8,666,130 | B2* | 3/2014 | Elwell ............................ 382/128 |
| 8,687,068 | B2* | 4/2014 | Chang et al. .................. 348/188 |
| 2011/0292219 | A1 | 12/2011 | Chang et al. |
| 2012/0019628 | A1 | 1/2012 | Jian |
| 2012/0019670 | A1 | 1/2012 | Chang et al. |
| 2012/0069195 | A1 | 3/2012 | Chang et al. |
| 2012/0105805 | A1 | 5/2012 | Kuo et al. |
| 2012/0127320 | A1 | 5/2012 | Balogh |

OTHER PUBLICATIONS

Brown, M. et al.; "Camera-based Calibration Techniques for Seamless Multi-projector Displays"; issue date: Mar.-Apr. 2005; http://graphics.ics.uci.edu/upload/TVCG05.pdf > On pp. 193-206: vol. 11: Issue: 2.

Li, T. et al.; "Geometric Calibration of a Camera-projector 3D Imaging System"; issue date: 2011 ; http://dl.acm.org/citation.cfm?id=2087783 > On pp. 187-194.

Nelson L Chang, et al; "Decoding positional and color information from a coded pattern"; published at the IEEE Int'l Conference on Image Processing; Sep. 26-29, 2010.

* cited by examiner

*Primary Examiner* — Phu K Nguyen
(74) *Attorney, Agent, or Firm* — Hewlett-Packard Patent Department

(57) ABSTRACT

An image processing system generates a correspondence mapping between an imaging system and a directional rendering system using first and second images captured to include and first and second coded patterns displayed simultaneously in at least partially non-overlapping views.

17 Claims, 3 Drawing Sheets

US 9,052,186 B2

CORRESPONDENCE MAPPING BETWEEN AN IMAGING SYSTEM AND A DIRECTIONAL RENDERING SYSTEM

BACKGROUND

Directional rendering systems may be configured to generate a set of views based on a set of images. Each view may provide different images to allow for effects like 3D. To properly align the views, a calibration of a system is generally performed to allow the desired viewing effects to be fully realized. With multiple views, however, capturing a single image of a display with a camera likely does not include sufficient information to perform the calibration.

DETAILED DESCRIPTION

In the following detailed description, reference is made to the accompanying drawings, which form a part hereof, and in which is shown by way of illustration specific embodiments in which the disclosed subject matter may be practiced. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

As described herein, an image processing system calibrates a directional rendering system using coded patterns that are designed such that each subregion is uniquely decodable. The directional rendering system displays the coded patterns in different views simultaneously, where the views are at least partially non-overlapping. Each view represents a volume of physical space where the directional rendering system forms a visible image that may differ at least in part from the visible images formed in other views. An imaging system captures an image for each view to include the corresponding coded pattern. The image processing system decodes the coded patterns from the captured images and generates a correspondence mapping between the directional rendering system and the imaging system. In one example, the directional rendering system includes multiple projectors and a highly directive display surface (i.e., a surface with high gain (i.e., a gain greater than one) or a non-Lambertian surface with narrow light scattering angles) that produces multiple views that are at least partially non-overlapping.

Figure 1:
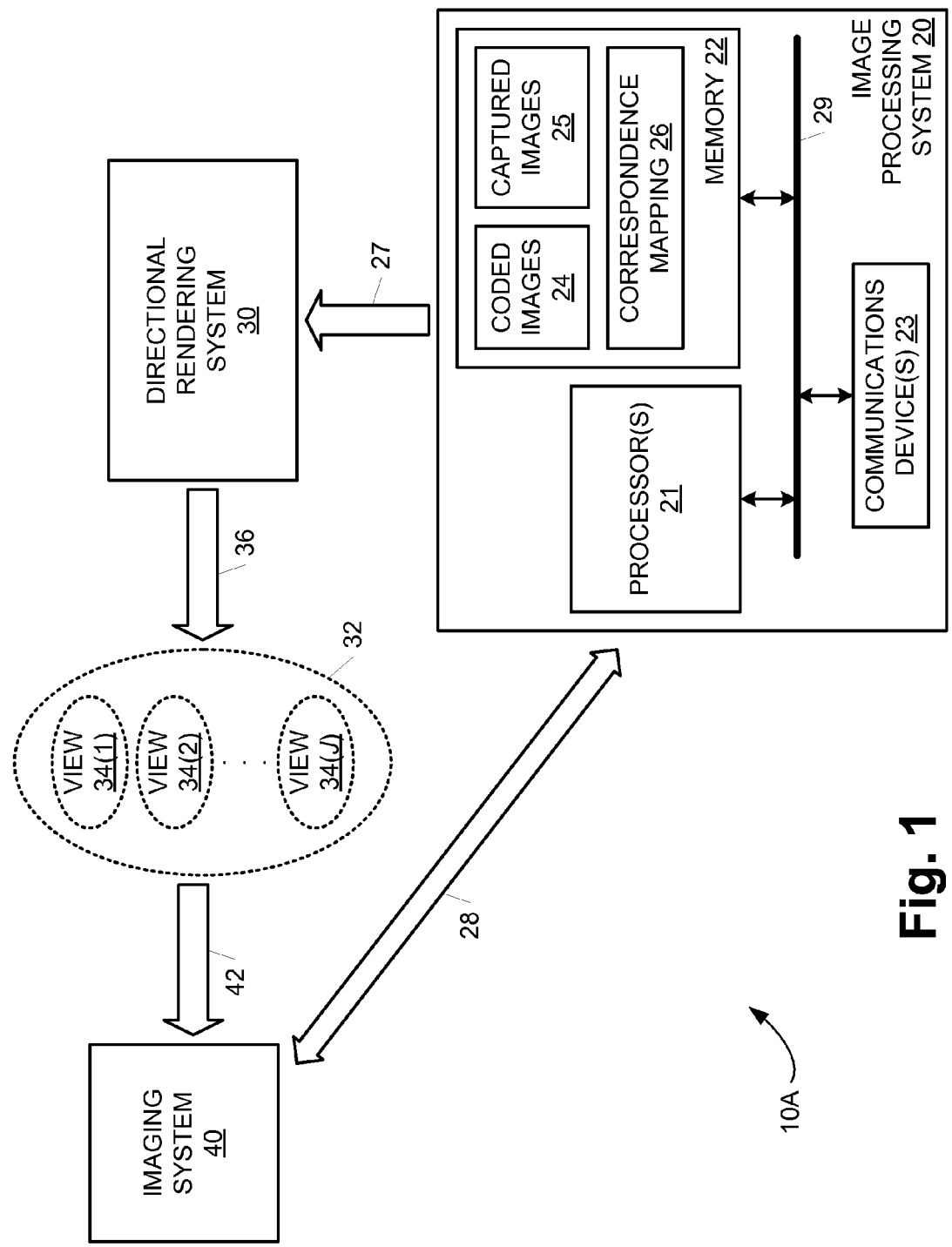
FIG. 1 is a schematic diagram illustrating an example of a display system with an image processing system to generate a correspondence mapping between a directional rendering system and an imaging system.

FIG. 1 is a schematic diagram illustrating an example of a display system 10A with an image processing system 20 to generate a correspondence mapping 26 between a directional rendering system 30 and an imaging system 40.

Image pressing system 20 is configured to calibrate display system 10A by generating correspondence mapping 26 from coded images 24 and captured images 25. Image processing system 20 provides coded images 24 to directional rendering system 30 for display as indicated by an arrow 27 and receives captured images 25 from imaging system 40 as indicated by an arrow 28. Image processing system 20 may also control the operation of directional rendering system 30 and/or imaging system 40 to direct the timing of the display of coded images 24 and/or the capture of captured images 25.

Directional rendering system 30 displays at least two of coded images 24 simultaneously in different ones of views 34(1)-34(J), where J is an integer that is greater then or equal to two, in a scene 32 as indicated by an arrow 36. Each view 34 represents a volume of physical space where directional rendering system 30 forms a visible image that may differ at least in part from the visible images formed in other views 34. A viewer or imaging system 40 perceives a first image when in the volume of physical space of view 34(1), for example, and a second image that differs from the first image when in the volume of physical space of view 34(2). A viewer who has one eye located in view 34(1) and the other eye located in view 34(2) may perceive both images from view 34(1) and view 34(2) simultaneously to see a 3D effect.

Each view 34 is at least partially non-overlapping with all other views 34 to allow images formed within each view 34 may be seen, at least partially, independently of other images formed by other views 34. Thus, a viewer or imaging system 40 sees only an image formed by a given view 34 without substantial interference from images formed by other views 34 in at least part of the volume of physical space of the given view 34. As a result, each image formed by each view 34 is independently discernable by a viewer or imaging system 40 in at least part of the volume of physical space of each view 34.

Each coded image 24 includes a unique coded pattern for display in each view 34 where the coded patterns uniquely specify the correspondence mapping 26 (i.e., the mapping between the coordinates (e.g. x-y, or more generally x, y, z, th, phi) of one space to those of a second space, and ideally vice versa) from imaging system 30 to the components of directional rendering system 30 that form each view 34. Each coded patterns is defined such that any subportion of the pattern is unique within that pattern.

In one example described in additional detail below, each coded pattern may be an M×N pattern (e.g., an M×N rectangular grid), where M and N are each integers greater than two, with a spatial configuration of R×S color codas (i.e., R colors-by-S colors coming from a basis of K colors, where R and S are each integers greater than two, R<M, and S<N), where each color code is uniquely decodable. Each color codes may overlap with other color codes within a coded pattern (e.g., by overlapping with at least three other color codes within a coded pattern). Additional constraints may be placed to help define unique codes across multiple patterns as well as to help improve color decoding. Such patterns are specially designed to encode geometry and luminance/color information into a single pattern.

Directional rendering system 30 may be implemented using any suitable display components configured to generate at least partially non-overlapping views 34. The components may include a directional display surface along with front or rear projectors or other suitable light modulating components.

Imaging system 40 includes any suitable type, number, and/or configuration of camera or other imaging devices that capture images 25 from scene 32 as indicated by an arrow 42.

For example, imaging system 40 may include a single camera that is moved into arbitrary locations in each view 34 in order to capture an image 25 in each view 34 sequentially while each view 34 is simultaneously displaying a corresponding coded image 24. In another example, imaging system 40 may include multiple cameras positioned in arbitrary locations in corresponding views 34 in order to simultaneously capture images 25 in corresponding views 34 while the views 34 are simultaneously displaying corresponding coded images 24. Imaging system 40 provides captured images 25 to image processing system 20 as indicated by arrow 28.

Using coded images 24 and captained images 25, image processing system 20 generates correspondence mapping 26 by decoding the coded patterns in captured images 25 and matching the decoded patterns to coordinate locations in coded images 24. By doing so, image processing system 20 identifies the component of directional rendering system 30 (e.g., the projector) that displayed the coded pattern in the corresponding view 34 that was captured by captured imaging system 40.

In examples where the coded patterns are based on known colors, image processing system 20 also determines color and luminance transformations for each component of directional rendering system 30 using coded images 24 and captured images 25.

In some examples, image processing system 20 may generate the coded patterns of coded images 24 to each include unique spatial configurations of color codes where each color code includes a unique configuration of colors selected from a number of basis colors. The color codes may each include the same number of colors.

Image processing system 20 includes a set of one or more processors 21 configured to execute a set of instructions stored in a memory system 22, and at least one communications device 23 to communicate with directional rendering system 30 and imaging system 40. Processors 21, memory system 22, and communications devices 23 communicate using a set of interconnections 29 that includes any suitable type, number, and/or configuration of controllers, buses, interfaces, and/or other wired or wireless connections.

Each processor 21 is configured to access and execute instructions stored in memory system 22 and to access and store data in memory system 22. Memory system 22 stores instructions that, when executed by processors 21, causes-processors 21 to perform the functions of image processing system 20. Memory system 22 also stores coded images 24, captured images 25, and correspondence mapping 26.

Memory system 22 includes any suitable type, number, and configuration of volatile or non-volatile machine-readable storage media configured to store instructions and data. Examples of machine-readable storage media in memory system 22 include hard disk drives, random access memory (RAM), read only memory (ROM), flash memory drives and cards, and other suitable types of magnetic and/or optical disks. The machine-readable storage media are considered to be part of an article or article of manufacture. An article or article of manufacture refers to one or more manufactured components.

Communications devices 23 include any suitable type, number, and/or configuration of communications devices configured to allow processing system 120 to communicate across one or more ports, one or more wired or wireless networks, and/or one or more other suitable connections.

Figure 2:
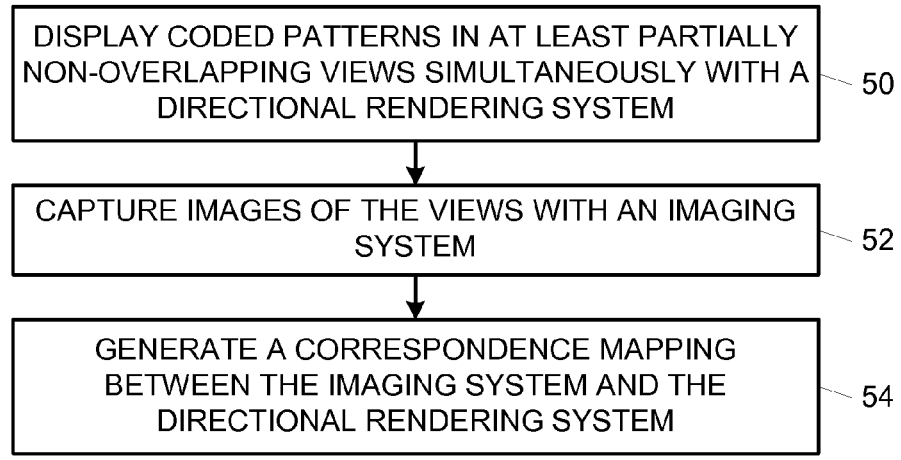
FIG. 2 is a flow chart illustrating an example of a method for generating a correspondence mapping between a directional rendering system and an imaging system.

FIG. 2 is a flow chart illustrating an example of a method for generating a correspondence mapping 26 between directional rendering system 30 and imaging system 40 as performed by display system 10A. Directional rendering system 30 displays coded patterns from coded images 24 in at least partially non-overlapping views 34 simultaneously as indicated in a block 50. Imaging system 40 captures images 25 of views 34 as indicated in a block 52. As described above, imaging system 40 may capture images 25 sequentially with one or more cameras or simultaneously with multiple cameras while the coded patterns are being displayed. Image processing system 20 generates correspondence mapping 26 between directional rendering system 30 and imaging system 40 as indicated in a block 54 by decoding the coded patterns from captured images 25 and identifying the corresponding patterns in coded images 24.

Figure 3:
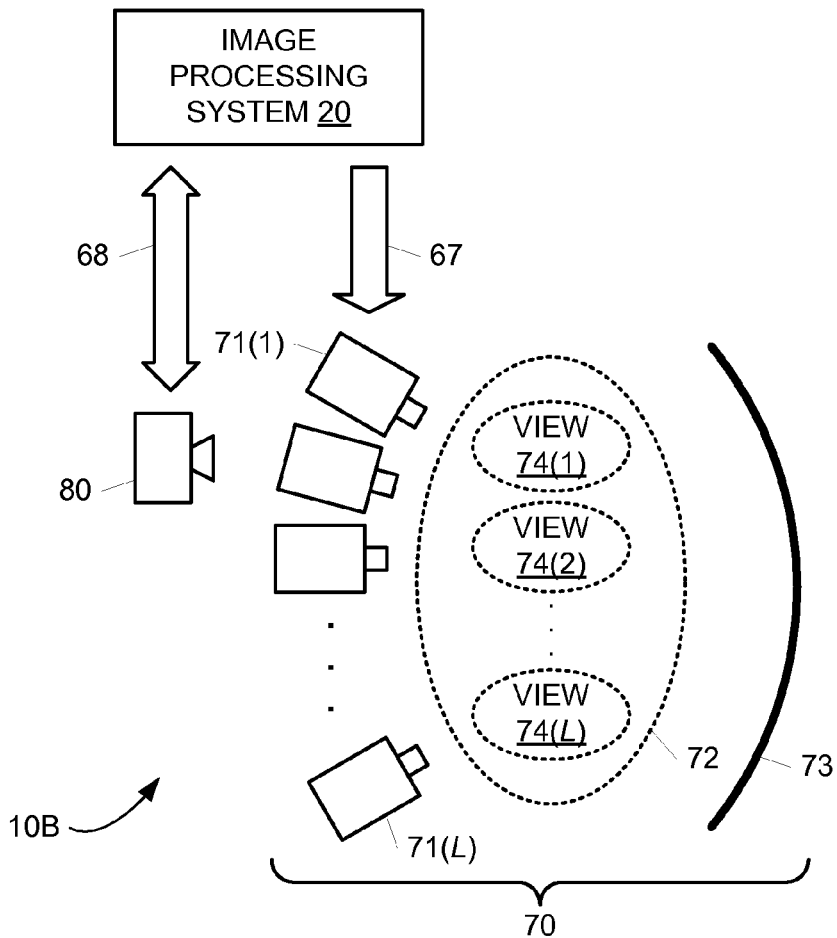
FIG. 3 is a schematic diagram illustrating an example of a display system with an image processing system to generate a correspondence mapping between multiple projectors and an imaging system.

FIG. 3 is a schematic diagram illustrating an example of a display system 10B with image processing system 20 to generate a correspondence mapping between multiple projectors 71(1)-71(L) in a directional rendering system 70, where L is an integer that is greater than or equal to two, and a camera 80 that forms an imaging system.

As with the example of FIG. 1, image processing system 20 is configured to calibrate display system 10B by generating correspondence mapping 26 from coded images 24 and captured images 25. Image processing system 20 provides coded images 24 to each projector 71 for display as indicated by an arrow 67 and receives captured images 25 from camera 80 as indicated by an arrow 68. Image processing system 20 may also control the operation of directional rendering system 70 and/or camera 80 to direct the timing of the display of coded images 24 and/or the capture of captured images 25.

Directional rendering system 70 also includes a display surface 73 that is one of a highly directive display surface (i.e., a surface with high gain (i.e., a gain greater than one) or a non-Lambertian surface with narrow light scattering angles (e.g., 0.1 degree or less). With display surface 73, the light output may be dependent on both the incident angle from the projected ray from projectors 71 and the transmitted/reflective angle with respect to display surface 73. Display surface 73 may have a concave shape, as shown, or another suitable shape to produce views 74(1)-74(L) in a scene 72 that are at least partially non-overlapping and correspond to projectors 71(1)-71(L) in one example. In one specific example, display surface 73 may be a curved brushed metal display surface having a scattering angle of approximately 0.1 degrees horizontal by 60 degrees vertical with anisotropic diffusion. In other examples, sets of projectors 71(1)-71(L) may be combined to form each view 74 such that there are fewer views 74 than projectors 71.

Projectors 71 project at least two of coded images 24 simultaneously onto display screen 73 to form different views 74. Each coded image 24 includes a unique coded pattern for display in each view 74 where the coded patterns uniquely specify the correspondence mapping 26 from imaging system 30 to corresponding projectors 71. Each view 74 represents a volume of physical space where one or more projectors 71 forms a visible image that may differ from the visible images formed in other views 74. Each view 74 is at least partially non-overlapping with all other views 34 to allow images formed within each view 74 may be seen, at least partially, independently of other images formed by other views 74.

If the diffusion of display screen 73 is sufficiently narrow, then all projectors 71 may project corresponding coded patterns into corresponding views 74 simultaneously and still allow camera 80 to see exactly one coded pattern in each view 74. Otherwise, sequential subsets of projectors 71 (e.g., every other projector 71) may project corresponding coded patterns into corresponding views 74 simultaneously to allow camera 80 to see exactly one coded pattern in each view 74.

Camera 80 is positioned with respect to projectors 71 and screen 73 in each view 74 sequentially to capture each coded pattern in captured images 25 in turn. Fixed fiducials (e.g., a screen border or other fixed target in scene 72) may be added to scene 72 to help set the reference between camera 80 and screen 73. Additional cameras 80 may also be used to simplify the process of capturing images 25 from each view 74.

To decode each pattern from captured images 25, image processing system 20 decodes the color codes in a captured image 25 and determines which coded pattern from coded images 24 is visible. Using the example described with reference to FIGS. 4A-4B below, image processing system 20 handles errors, outliers, and occlusions in scene 72 in determining which projector 71 projected the coded pattern captured in an image 25.

After identifying the corresponding projector 71, image processing system 20 generates correspondence mapping 26 by matching spatial coordinates of each decoded color code from a captured image 25 with spatial coordinates of the color code in a corresponding coded pattern in a corresponding image 24. With known conditions, an a priori model may be used to further help robustify correspondence mapping 26 and come up with the complete 2D-2D mapping between camera 80 and projectors 71. In some cases, such as wherein display surface 73 is a planar surface, image processing system 20 uses correspondence mapping 28 to solve for actual 3D coordinates in scene 72 (e.g., using structure from motion methods) as well as to solve for internal camera calibration parameters (e.g., non-linear lens distortion).

In examples where the coded patterns are based on known colors, image processing system 20 may further decode color and luminance transformations between camera 80 and projectors 71 based on the available basis colors in the coded patterns.

Using the above techniques, image processing system 20 may produce an accurate model from camera 80 to each projector 71 that enables a full characterization of the 4D transmission or reflective field (from output projector ray to input camera ray). In examples where the decoding of color codes is sufficiently fast, image processing system 20 may effectively "paint" scene 72 using camera 80 as camera 80 moves in real-time across views 74 to generate correspondence mapping 26.

The above techniques may also be extended to perform full 3D calibration as well as to achieve higher resolution through spatial and/or temporal extensions. The above techniques may be used to measure scattering angle and other screen properties of display surface 73. The full 3D shape as well as relative positions of camera 80 and projectors 71 may be estimated by doing shape from motion/structure from motion. High resolution and denser results may be achieved by temporally changing coded patterns and/or shifting the coded patterns (e.g., with synchronization).

Figure 4A:
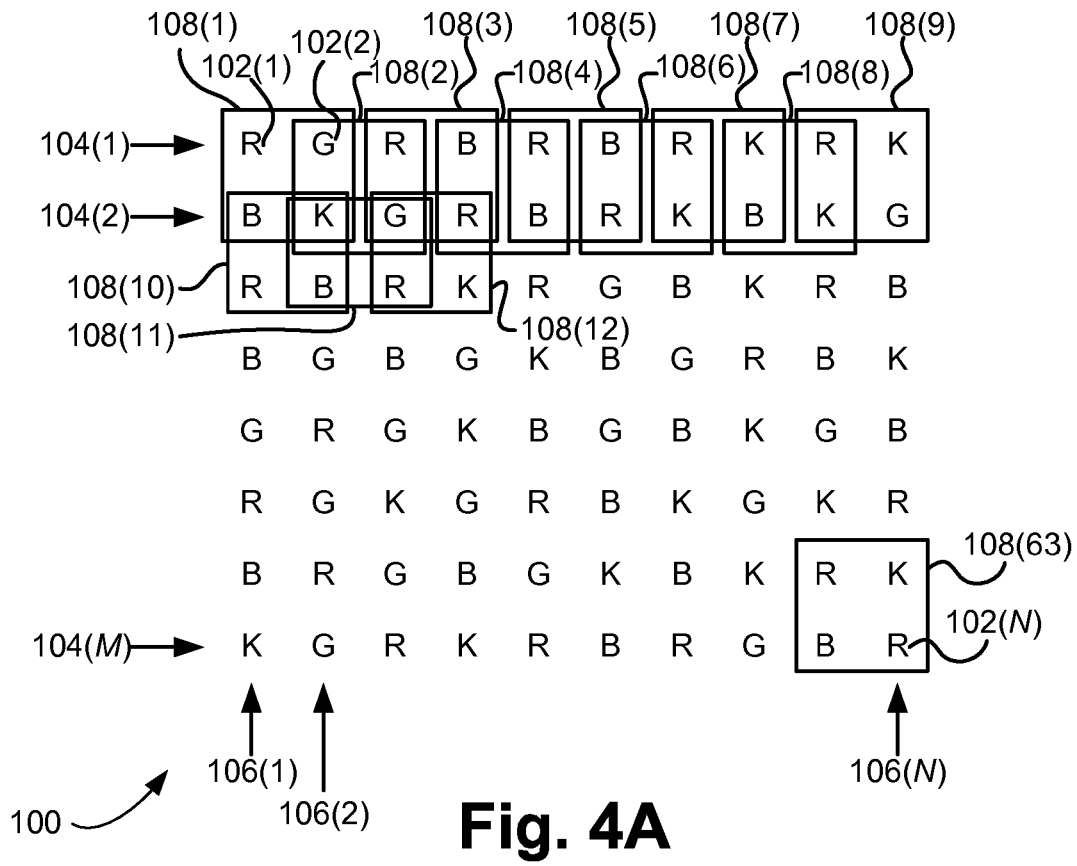
FIGS. 4A-4B are schematic diagrams illustrating an example of a coded pattern of color codes.
Figure 4B:
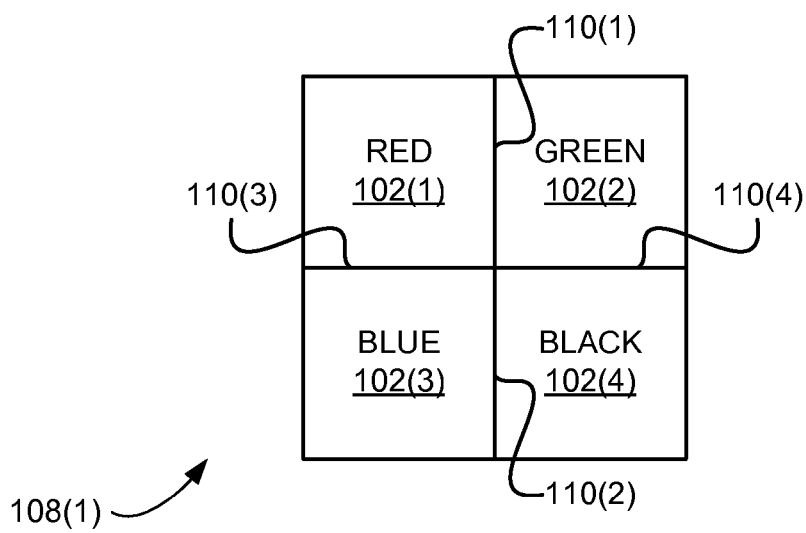

FIGS. 4A-4B are schematic diagrams illustrating an example of a coded pattern 100 of color codes 108. Pattern 100 includes colors 102(1)-102(N), collectively referred to as colors 102, where N is an integer greater than or equal to two. Each color 102 is one of four basis colors. In the example of FIG. 4A, the basis colors are red ("R"), green ("G"), blue ("B"), and black ("K"). However, the basis colors for other patterns may include other colors, in addition to and/or in lieu of red, green, blue, and black. For instance, the basis colors may include cyan, magenta, yellow, and/or white, in addition to and/or in lieu of red, green, blue, and black.

Colors 102 are organized in pattern 100 as a rectangular grid having a number of rows 104(1)-104(M), collectively referred to as rows 104, where M is an integer greater than or equal to two and a number of columns 106(1)-106(N), collectively referred to as columns 106. In the example of FIG. 4A, there are eight rows 104 and ten columns 108, such that pattern 100 is an eight colors-by-ten colors grid. More generally, there are M rows 104 and N columns 106. Colors 102 may be organized in a manner other than a rectangular grid in other examples (e.g., including non uniform spacing (i.e. some columns and/or rows are bigger and/or smaller than others, etc.)).

Pattern 100 includes a spatial configuration of color codes 108(1)-108(63), collectively referred to as the color codes 108. For illustrative clarity, not all color codes 108 are depicted in FIG. 4A. In the example of FIG. 4A, there are sixty-three color codes 108. Other examples may include other suitable numbers of color codes 108.

A color code 108 is defined as follows. First, each color code 108 is a unique configuration of colors 102 selected from the basis colors. For instance, color code 108(1) includes red in the upper left-hand corner, green in the upper right-hand corner, blue in the lower left-hand corner, and black in the lower right-hand corner. There is no other color code 108 in pattern 100 that has these four colors in these four positions. There may be other color codes 108 that include red, green, blue, and black, but not in the same positions as in the color code 108(1).

Second, each color code 108 overlaps other color codes 108 within pattern 100. For instance, color codes 108(1), 108(9), and 108(63) that are located on the corners of pattern 100 each overlap three other color codes 108. As a specific example, the color code 108(1) overlaps the color codes 108 (2), 108(10), and 108(11). Furthermore, the color codes 108 (2), 108(3), 108(4), 108(5), 108(6), 108(7), 108(8), and 108 (10) that are located on the edges of pattern 100 but that are not on the corners of pattern 100 overlap five other color codes 108. As a specific example, the color code 108(2) overlaps the color codes 108(1), 108(3), 108(10), 108(11), and 108(12). Finally, each color code 108 that is not on an edge or a corner of pattern 100 overlaps eight other color codes 108.

Third, color codes 108 each include the same number of colors 108. In the example of FIG. 4A, each color code 108 includes four colors organized as a two color-by-two color rectangular grid. More generally, each color code 108 may be organized as an R colors-by-S colors rectangular grid. For a pattern 100 that is an M colors-by-N colors grid, there are (R−M+1)×(S−N+1) R colors-by-S colors color codes 108, where there are $C^{R \times S}$ unique color codes 108 for C different basis colors. Furthermore, it is noted that even more generally still, each color code 108 may be organized in a manner other than a rectangular grid.

It is further noted that in the example of FIG. 4A, pattern 100 is defined as including all two color-by-two color rectangular grids as color codes 108. That is, every possible two color-by-two color rectangular grid in the pattern 100 is considered to be a color code 108 of pattern 100. No two color-by-two color rectangular grids are excluded in the pattern 100 from being a color code 108, in other words. In other examples, however, certain locations within pattern 100 may not correspond to valid color codes 108, although the identities of these locations would be known a priori when pattern 100 is detected within a captured image.

Fourth, each color code 108 has one or more reference spatial coordinates within pattern 100 that spatially locate the color code 108 within pattern 100. As a rudimentary example, color codes 108 may be consecutively numbered, where it is known a priori that a given reference number (i.e., coordinate) corresponds to a particular location within pattern 100. As another example, pattern 100 may have row numbers and column numbers, such that a given reference pair of a row number and a column number (i.e., coordinates) corresponds to a particular location within pattern 100.

As a third example, pattern 100 may have units along an x-axis and along a y-axis, such as pixels, units of length, and so on. A particular color code 108 is spatially located in this example by a pair of reference numbers (i.e., coordinates) along the x- and y-axes. The pair of reference numbers may specify the center point of the color code 108, or another predetermined part of the color code 108, such as its upper left-hand pixel, and so on. In general, this pair of reference numbers specifies a fixed, known, and detectable position within pattern 100 relative to the color code 108 in question.

FIG. 4B shows additional details of color code 108(1) of pattern 100. Color code 108(1) has four colors 102(1)-102(2) that, in the example of FIG. 4B, are red, green, blue, and black, respectively. Color codes 102(1) and 102(2) share a boundary 110(1), color codes 102(3) and 102(4) share a boundary 110(2), color codes 102(1) and 102(3) share a boundary 110(3), and color codes 102(2) and 102(4) share a boundary 110(4). Boundaries 110(1)-110(4) are collectively referred to as boundaries 110 and may also be called referred to as edges of the color code 100(1). In one example, all four boundaries 110(1)-110(4) are distinct. In other examples, not all four boundaries 110(1)-110(4) need to be distinct.

The single captured image per view (e.g., per projector) decoding described herein may facilitate a faster process for geometry calibration and color and luminance calibration as well as for rendering component (e.g., projector) identification and enables multiple locations in the viewing volume to be captured. The approach may simplify and enhance the robustness of the calibration process for directive display surfaces regardless of shape (e.g., planar or curved, etc.) and diffusion (e.g., isotropic or anisotropic). A single captured pattern per projector may be used to identify each projector and determine the geometric and color parameters of each projector, and the coded patterns that are captured may be displayed simultaneously.

What is claimed is:

1. A display system comprising:
    a directional rendering system to simultaneously display first and second coded patterns in first and second views, respectively, where the first and the second views are at least partially non-overlapping;
    an imaging system to capture first and second images of the first and the second views, respectively; and
    an image processing system to generate a correspondence mapping between the imaging system and the directional rendering system using the first and the second images and the first and the second coded patterns.

2. The display system of claim 1 wherein the imaging system includes a camera, wherein the camera is to capture the first captured image in the first view from a first location, and wherein the camera is to capture the second captured image in the first view from a second location.

3. The display system of claim 1 wherein the imaging system includes first and second cameras to capture the first and the second images, respectively, in the first and the second views, respectively.

4. The display system of claim 1 wherein the directional rendering system includes a first projector to project the first coded pattern in the first view and a second projector to project the second coded pattern in the second view.

5. The display system of claim 1 wherein the first coded pattern includes a first spatial configuration of a plurality of color codes and the second coded pattern includes a second spatial configuration of the plurality of color codes, each color code including a unique configuration of colors selected from a number of basis colors, the color codes each including a same number of colors.

6. The display system of claim 5 wherein each color code of the first coded pattern overlaps other color codes within the first coded pattern, and wherein each color code of the second coded pattern overlaps other color codes within the second coded pattern.

7. The display system of claim 5 wherein each of the first and the second coded patterns is an M colors-by-N colors rectangular grid, and each color code is an R colors-by-S colors rectangular grid, such that each color code overlaps at least three other color codes within the pattern.

8. The display system of claim 1 wherein image processing system is to determine a color transformation between the first and the second images and the first and the second coded patterns.

9. The display system of claim 1, wherein the first coded pattern is different than the second coded pattern.

10. The display system of claim 1, wherein the first view and the second view are completely non-overlapping.

11. A method performed by a display system, the method comprising:
    projecting first and second coded patterns simultaneously with first and second projectors to form first and second views that are at least partially non-overlapping;
    capturing first and second images of the first and the second views, respectively, with an imaging system; and
    determining a correspondence mapping between the imaging system and the first and the second projectors using the first and the second images, respectively, and the first and the second coded patterns, respectively.

12. The method of claim 11 further comprising:
    capturing the first and second images in the first and the second views, respectively, with the imaging system at different times.

13. The method of claim 11 further comprising:
    capturing the first and second images in the first and the second views, respectively, with the imaging system simultaneously.

14. The method of claim 11 wherein the first coded pattern includes a first spatial configuration of a plurality of color codes and the second coded pattern includes a second spatial configuration of the plurality of color codes, each color code including a unique configuration of colors selected from a number of basis colors, the color codes each including a same number of colors.

15. An article comprising at least one machine-readable storage medium storing instructions that, when executed by a processing system, cause the processing system to:
    receive first and second images captured by an imaging system to include first and second coded patterns simultaneously displayed in first and second views by a directional rendering system, where the first and the second views are at least partially non-overlapping; and
    generate a correspondence mapping between the imaging system and the directional rendering system using the first and the second images and the first and the second coded patterns.

16. The article of claim 15, wherein the first coded pattern includes a first spatial configuration of a plurality of color codes and the second coded pattern includes a second spatial configuration of the plurality of color codes, each color code including a unique configuration of colors selected from a number of basis colors, the color codes each including a same number of colors.

17. The article of claim 15, wherein the instructions, when executed by the processing system, cause the processing system to:
- generate the first coded pattern to include a first spatial configuration of a plurality of color codes, each color code including a unique configuration of colors selected from a number of basis colors, the color codes each including a same number of colors; and
- generate the second coded pattern to include comprising a second spatial configuration of the plurality of color codes.

* * * * *